(12) United States Patent
Warashina et al.

(10) Patent No.: US 7,367,230 B2
(45) Date of Patent: May 6, 2008

(54) FLOW RATE DETECTOR AND FLOW CONTROLLER

(75) Inventors: Isamu Warashina, Tokyo (JP); Osamu Momose, Tokyo (JP); Hiroyuki Inagaki, Tokyo (JP)

(73) Assignee: Yamatake Corporation, Tokyo (JP)

( * ) Notice: Subject to any disclaimer, the term of this patent is extended or adjusted under 35 U.S.C. 154(b) by 16 days.

(21) Appl. No.: 10/562,958

(22) PCT Filed: Jul. 5, 2004

(86) PCT No.: PCT/JP2004/009537

§ 371 (c)(1),
(2), (4) Date: Dec. 30, 2005

(87) PCT Pub. No.: WO2005/003692

PCT Pub. Date: Jan. 13, 2005

(65) Prior Publication Data

US 2006/0144137 A1 Jul. 6, 2006

(30) Foreign Application Priority Data

Jul. 3, 2003 (JP) ............................ 2003-270803

(51) Int. Cl.
*G01F 15/02* (2006.01)
*G01F 1/20* (2006.01)
(52) U.S. Cl. ..................................... 73/198; 73/861.19
(58) Field of Classification Search ............. 73/861.19, 73/198
See application file for complete search history.

(56) References Cited

U.S. PATENT DOCUMENTS 4,611,216 A * 9/1986 Ishikawa et al. .............. 347/81
5,157,974 A * 10/1992 Hattori et al. ............ 73/861.19
5,218,872 A * 6/1993 Hattori et al. ............ 73/861.19
5,309,770 A * 5/1994 Okabayashi ............. 73/861.19

FOREIGN PATENT DOCUMENTS

| JP | 09-089618 A | 4/1997 |
| JP | 10-002768 A | 1/1998 |
| JP | 2592418 Y2 | 1/1999 |
| JP | 11-132813 A | 5/1999 |
| JP | 11-230803 A | 8/1999 |
| JP | 2000-081914 A | 3/2000 |

OTHER PUBLICATIONS

English translation of Written Opinion issued in International Application No. PCT/JP2004/009537 filed Jul. 5, 2004.

* cited by examiner

*Primary Examiner*—Harshad Patel
(74) *Attorney, Agent, or Firm*—Frishauf, Holtz, Goodman & Chick, P.C.

(57) ABSTRACT

A path detector is constructed so that a path block body, which forms a given path and which has a flow sensor interposed in the path, and a circuit board having an electric circuit mounted thereon are accommodated in a rectangular parallelepiped or cubic housing. An indicator and an operation switch are provided in a front surface portion of the housing that is exposed at a front surface of a given panel when the housing is fixed to the panel. The path in the path block body is U-shaped path and has an inlet and an outlet in a back surface portion of the housing. A terminal for external connection of the circuit board is also disposed in the back surface portion of the housing.

4 Claims, 7 Drawing Sheets

FLOW RATE DETECTOR AND FLOW CONTROLLER

This application is a U.S. National Phase Application under 35 USC 371 of International Application PCT/JP2004/009537 filed Jul. 5, 2004.

TECHNICAL FIELD

The present invention relates to a flow detector and a flow controller suitable for use in a state fixed to a given panel.

BACKGROUND ART

In the process of manufacturing semiconductors, for example, various kinds of gases are used. Generally in this kind of manufacturing process, in order to control a gas feed rate, a gas flow rate is regulated by interposing a flow detector and a flow controller in a gas-feeding path (gas pipe). The flow detector disclosed in Unexamined Japanese Patent Publication 11-132813 is made up of a block body forming a path basically interposed in a gas pipe, and a flow sensor that is installed in the block body and detects the flow rate of gas (fluid) flowing through the path. The flow controller disclosed in Unexamined Japanese Patent Publication 2000-81914 has a configuration in which the block body is further provided with a flow-regulating valve that regulates the flow rate of the gas (fluid).

On a fluid entry port side of the path (upstream side of the path) formed by the block body, there is commonly disposed a rectifier for preventing the turbulence of the gas (fluid) channeled into the path in a position upstream of the flow sensor. Such a flow detector and a flow controller are provided, for example in the front plate of their housing, with an indicator that indicates a flow rate value and the like measured by the flow detector and the flow controller by using the flow sensor, and an operation switch for setting a control parameter and the like with respect to the flow-regulating valve system.

In case that the flow detector and the flow controller are used in a state fixed to the given panel, the flow detector and the flow controller are usually fixed to the panel so that the front plate provided with the indicator and the operation switch is exposed to the front surface side of the panel. On the back surface side of the panel attached with the flow detector and the flow controller, the connection of pipes, electrical signal wires and the like, with respect to the flow detector and the flow controller is carried out.

As described in the above-mentioned publications, however, a conventionally common flow detector and flow controller have a configuration in which a fluid inlet and a fluid outlet are coaxially arranged to face in the opposite direction to each other so as to be used in a state interposed in the given pipe. For this reason, in case that a plurality of flow detectors and flow controllers like those described in the patent publications are utilized alongside of each other, it is necessary to secure space for piping with respect to the fluid inlet and the fluid outlet. This produces the problem that the flow detector and the flow controller cannot be installed close to each other.

DISCLOSURE OF THE INVENTION

It is an object of the present invention to provide a flow detector and a flow controller that make it possible to dispose a plurality of flow detectors and flow controllers close to each other even in case that they are utilized in an aligned state, and is so excellent in handling that connecting work of pipes, electrical signal wires and the like with respect to a fluid inlet and a fluid outlet can be carried out with ease.

In order to accomplish the above object, the flow detector according to the present invention has a path block body forming a given path and having a flow sensor interposed in the path, and a circuit board surmounted by an electric circuit that measures a flow rate of a fluid running through the path by using the flow sensor. The flow detector is constructed so that the path block body and the circuit board are accommodated in a rectangular parallelepiped or cubic housing.

The flow detector is characterized in that an indicator and an operation switch are provided in a front surface portion of the housing that is exposed to the front surface of a given panel when fixed to the panel, that an inlet and an outlet of the path are provided in a back surface portion of the housing, and a terminal for external connection of the circuit board is further provided in the back surface portion of the housing alongside of the inlet and the outlet.

The path block body forms a U-shaped path by arranging the inlet and the outlet of the path to face in the same direction. The circuit board is installed virtually parallel to the side face of the path block body along with the U-shaped path. The circuit board is preferably actualized so that a multiway connector for external connection is provided to an end portion positioned alongside the inlet and the outlet of the path.

The flow controller according to the present invention is actualized so that the path disposed in the flow detector constructed as described is provided with a flow-regulating valve that regulates a flow rate of a fluid running through the path.

The flow detector according to the present invention has a water-absorbing sheet around the inlet and the outlet of the path disposed in the back surface portion of the housing.

BEST MODE OF CARRYING OUT THE INVENTION

A flow controller according to the present invention will be described below with reference to the drawings.

A flow detector may be actualized substantially by removing a flow-regulating valve system from the flow controller described below. Therefore, the flow controller will be explained with an example, and a characteristic construction of the flow detector and the flow controller according to the present invention will be described.

Figure 1:
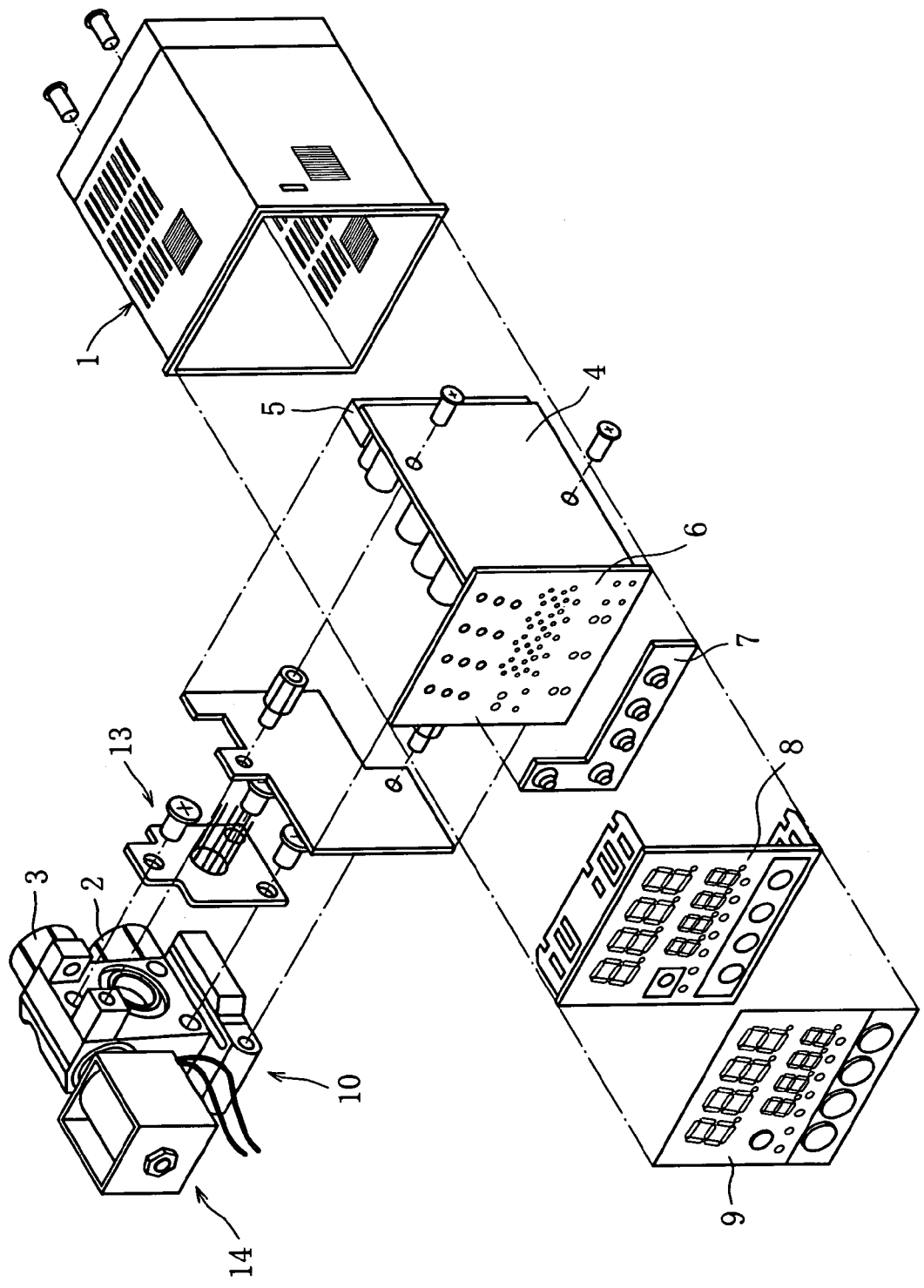
FIG. 1 is an exploded perspective view showing an entire configuration of a flow controller according to one embodiment of the present invention.

FIG. 1 is an exploded perspective view showing an entire general configuration of the flow controller according to an embodiment. Reference numeral 1 represents a rectangular parallelepiped housing the front surface of which is open. The housing 1 is a virtually rectangular parallelepiped housing made of reinforced plastic with for example a height of 48 millimeters, a width of 48 millimeters, and a depth of 61 millimeters. A path block body 10, in which there is formed a U-shaped path in the inside thereof as described below, and a fluid entry port 2 and a fluid exit port 3 of the path are vertically aligned to face in the same direction, is provided with a main circuit board 4 fixed to a side portion thereof. The path block body 10 is installed in the housing 1 together with the main circuit board 4 from the front surface side so that the fluid entry port 2 and the fluid exit port 3 are positioned on the rear side.

The path block body 10 is constructed by interposing a rectifier 12, a flow sensor 13 and a flow-regulating valve system 14 in the path as mentioned below. The main circuit board 4 is fixed to the side portion of the path block body 10. Mounted on the main board are electric circuits including a flow detection circuit that detects a flow rate of a fluid running through the path by using the flow sensor 13, a valve control circuit that controls the activation of the flow-regulating valve system 14 according to the detected flow rate, etc.

Figure 2:
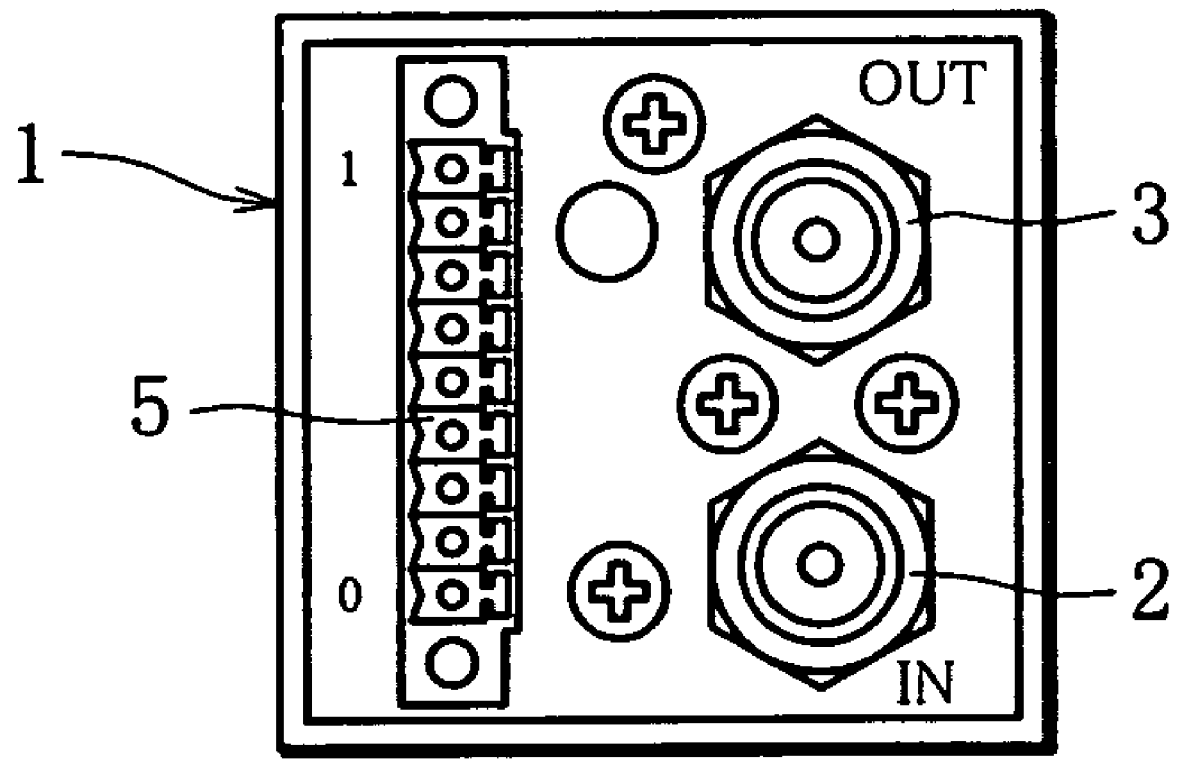
FIG. 2 is a view showing a configuration on the back surface side of the flow controller illustrated in FIG. 1.

In a rear end portion of the main circuit board 4, there is disposed a terminal 5 formed of a multiway connector for electrically connecting the main circuit board 4 to an external device (not shown). When the main circuit board 4 is fitted to the side portion of the path block body 10, the terminal (multiway connector) 5 is disposed alongside the fluid entry port 2 and the fluid exit port 3 provided on the rear side of the path block body 10 as illustrated in FIG. 2 showing a configuration of the back surface side of the housing 1.

A sub-circuit board 6 is fastened to the front end portion of the main circuit board 4 perpendicularly to the main circuit board 4. Mounted on the sub-circuit board 6 are a plurality of light-emitting elements for segment display, contact members for operation switches, a drive circuit thereof, etc. In a position facing the contact members on the sub-circuit board 6, there is disposed a pressure switch member 7 made up of a conductive elastic body. Installed in a position opposite to the light-emitting elements on the sub-circuit board 6 is a front plate 8 in which segment windows for displaying large figures are formed.

Reference numeral 9 in the drawing denotes a decorative panel disposed so as to cover the front plate 8. Illumination of the segment windows, which is caused by selective light emission of the light-emitting elements, is displayed with excellent visibility because of the decorative panel 9. The pressure switch member 7 made up of a conductive elastic body is pressed by the operator through the decorative panel 9, to thereby conduct between the contact members (switch activation) positioned on the back surface side thereof.

In other words, the flow controller configured by being installed in the boxshaped housing 1 has a construction in which an operating portion including the indicator and the operation switches is disposed in the front surface of the housing 1, and the fluid entry port 2, the fluid exit port 3, and the terminal (multiway connector) for electric connection 5 are disposed on the back plate side of the housing 1. In the flow controller, there is provided a flange with a given width, which is formed in the front opening end of the housing 1 to face outward. The flange is interfitted for example in a rectangular opening portion of 48 millimeters by 48 millimeters, which is formed by punching the panel, as an attachment portion of the panel, not shown, to thereby serve to fasten the flow controller. The flow controller thus fastened to the panel is used in a state where the operating portion thereof is exposed to the front surface side. The pipe connection and the electric connection of the signal wires with respect to the flow controller are carried out on the back surface side of the panel.

The construction of the path block body 10 that is a main body of the flow controller, and the flow sensor 13 and the like installed in the path block body 10 will be described below.

Figure 3:
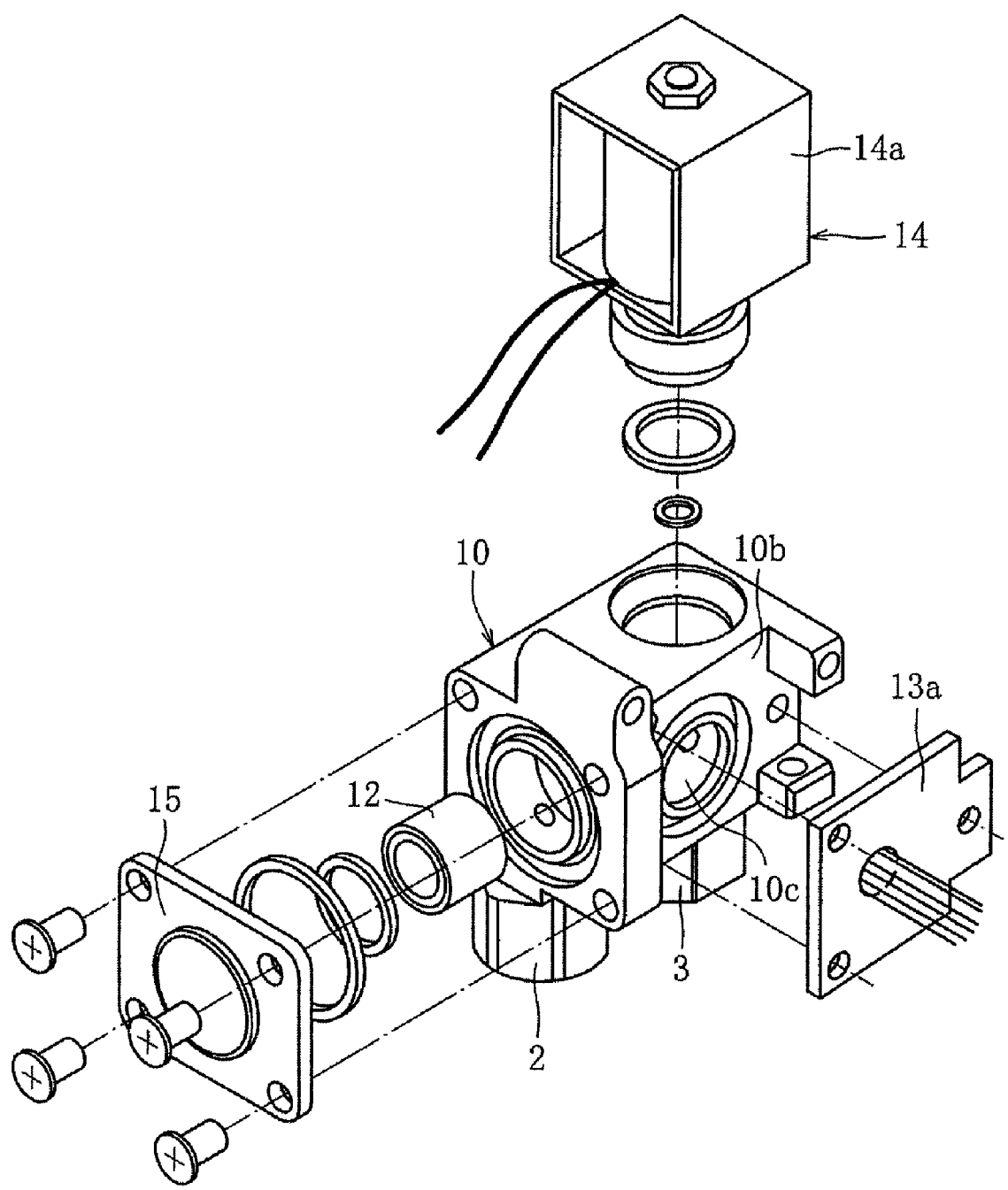
FIG. 3 is an exploded perspective view showing a general configuration of a substantial part of a main body of the flow controller.
Figure 4A:
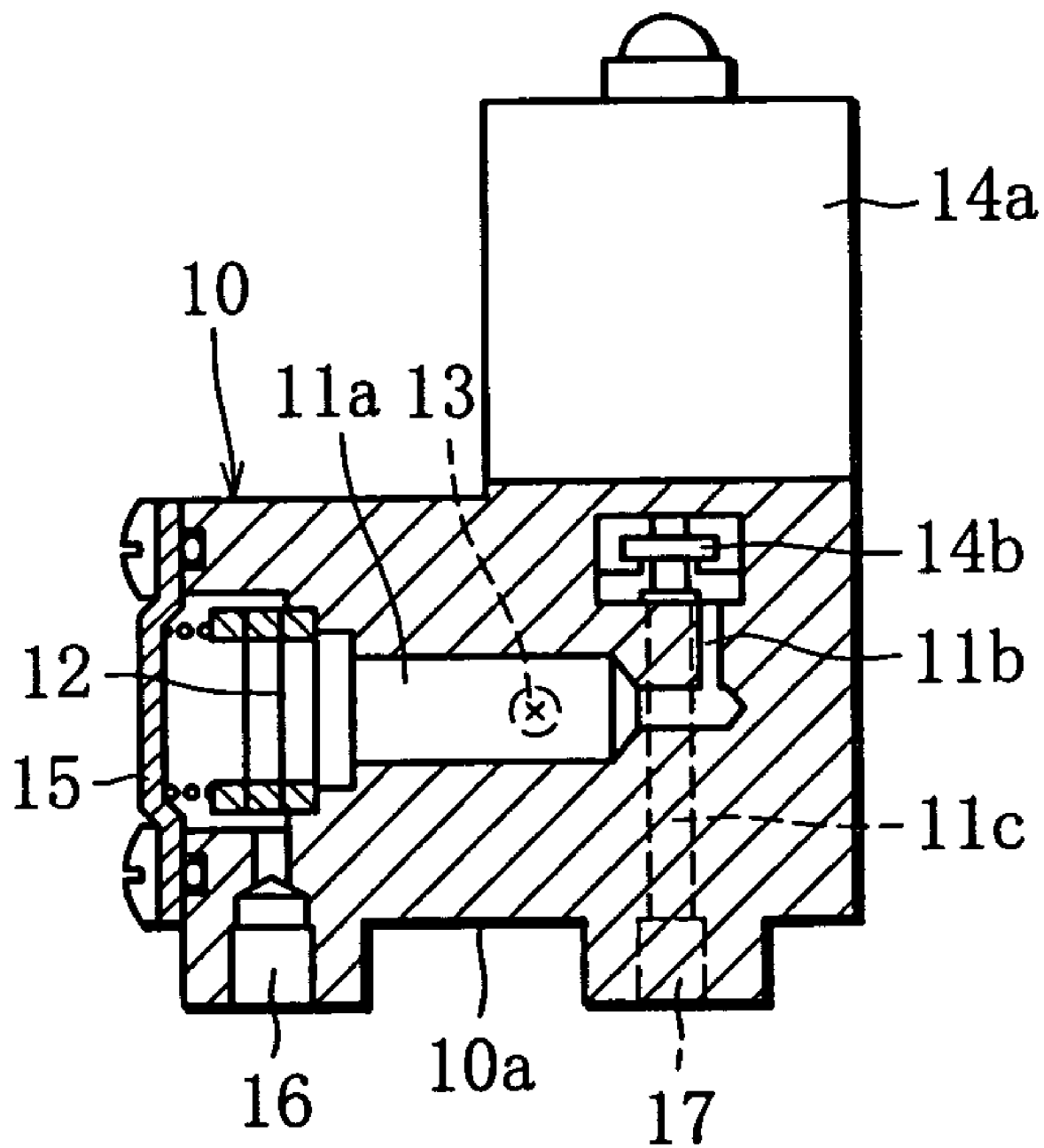
FIG. 4A is a sectional view for explaining a construction of the main body illustrated in FIG. 3.
Figure 4B:
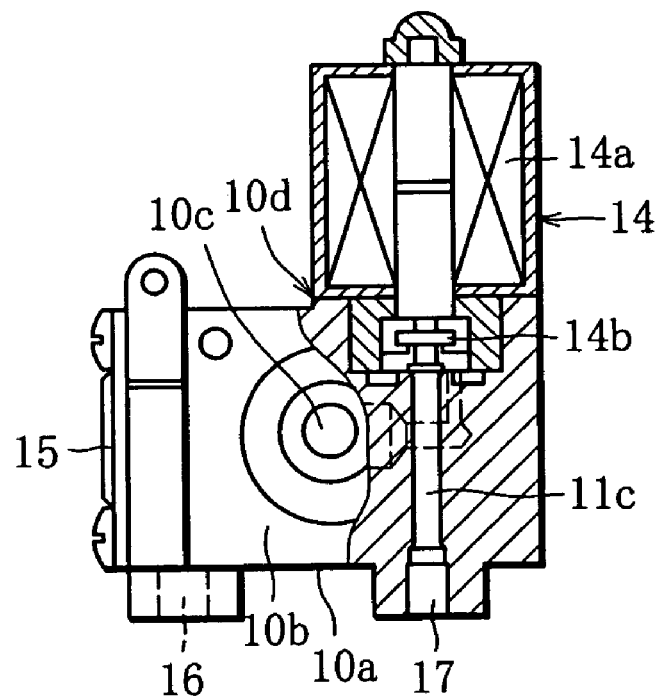
FIG. 4B is another sectional view for explaining the construction of the main body illustrated in FIG. 3.
Figure 4C:
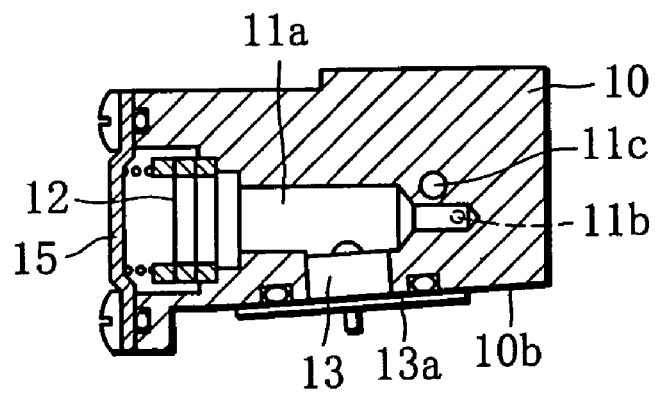
FIG. 4C is further another sectional view for explaining the construction of the main body illustrated in FIG. 3.

FIG. 3 is an exploded perspective view showing a general configuration of the main body of the flow controller. FIGS. 4A through 4C are views showing a cross-sectional construction of a substantial part. FIG. 3 and FIGS. 4A through 4C show the fluid entry port 2 and the fluid exit port 3 in a position facing downward. In practice, the fluid entry port 2 and the fluid exit port 3 are installed in the housing 1 to face backward as stated above.

The main body has the path block body 10 in which the U-shaped path is formed, the cylindrical rectifier 12 fitted on the upstream side (fluid inflow side) of a path 11 formed in the path block body 10, the flow sensor 13 interposed in a substantially middle position of the path 11, and the flow-regulating valve system 14 disposed on the downstream side (fluid outflow side) of the path. The flow-regulating valve system 14 is formed of a solenoid 14a and a flow-regulating valve 14b driven forward/backward by the solenoid 14a as illustrated in FIG. 4.

The path block body 10 has a substantially rectangular parallelepiped shape, and forms a first path 11a running linearly from one longitudinal end portion thereof toward a central portion thereof. The path block body 10 has a construction in which the rectifier 12 is coaxially mounted on the opening end side of the first path 11a (details described below), and the opening end is then closed with a cover 15. A portion (rectifier storage portion) in which the cylindrical rectifier 12 is fitted is formed of a hole having an internal diameter larger than an external diameter of the rectifier 12 as illustrated in FIGS. 4A and 4C, thereby forming a given space between the rectifier storage portion and an outer circumference of the rectifier 12.

The fluid entry port 2 of the flow controller, which continues to the first path 11a, forms a communicating portion (path) leading to the space, and opens toward a lower surface (surface positioned at the back after installation in the housing 1) 10a of the path block body 10 as illustrated in FIG. 4A. The fluid introduced from the fluid entry port 2 is first directed into the space formed between the rectifier storage portion and the outer circumferential surface of the cylindrical rectifier 12. The fluid is then directed from the space into the inside of the rectifier 12 through a given gap (described below) formed between the rectifier 12 and the cover 15. After being rectified by the rectifier 12, the fluid is directed into the first path 11a.

In a front surface (surface positioned at the side after installation in the housing 1) 10b of the path block body 10, there is formed a through hole 10c that continues to the first path 11a. The through hole 10c is provided for the purpose of positioning the flow sensor 13 to be aligned with the first path 11a. Specifically, as illustrated in FIG. 4C, a sensor bracket 13a previously attached with the flow sensor 13 is so installed as to airtightly block the through hole 10c from the outside of the block body 10. The flow rate of the fluid rectified by the rectifier 12 is measured by using the flow sensor 13 thus interposed in the first path 11a.

Fixed in an upper surface (surface positioned at the front after installation in the housing 1) 10d of the path block body 10 is the flow-regulating valve system 14 that is positioned downstream of the flow sensor 13.

Consequently, in the block body 10, there is formed a second path 11b that is bent at a virtually right angle from the end portion of the first path 11a formed in the longitudinal direction as described toward the upper surface 10d of the block body 10.

The end portion of the second path 11b opens in the upper surface 10d of the path block body 10.

A third path 11c is formed alongside of the second path 11b so that the second path 11b and an axis position of the third path 11c are located a little close to a side surface (surface positioned at the top after installation in the housing 1) of the block body 10, and so as to be parallel to the second path 11b. Especially, the third path 11c is formed through the block body 10 from the upper surface 10d of the block body 10 toward the lower surface 10a thereof. The end portion of the third path 11c, which opens in the lower surface 10a of the block body 10, is designed to serve as the fluid exit port 3 of the flow controller.

An opening portion (fluid outlet portion) of the second path 11b and an opening portion (fluid inlet portion) of the third path 11c are formed side by side in the upper surface (surface positioned at the front after installation in the housing 1) 10d of the block body 10. In the upper surface 10d of the block body 10, there is formed a path for connecting these opening portions, and moreover the flow-regulating valve 14b that regulates opening area of the path is fixed. In this particular example, the flow-regulating valve 14b is so disposed as to block the opening portion (fluid inlet portion) of the third path 11c, and is regulated in its valve opening by the solenoid 14a.

The fluid is directed from the first path 11a through the second path 11b to the flow-regulating valve system 14. After the fluid is regulated in its flow rate by using the flow-regulating valve 14b, the fluid is directed through the third path 11c to flow out from a fluid exit port 17.

As described, the main body of the flow controller has the flow sensor 13 and the flow-regulating valve system 14 in two different surfaces of the block body 10, more specifically the front surface 10b and the upper surface 10d, respectively. Therefore, the main body of the flow controller allows the flow sensor 13 and the flow-regulating valve system 14 to be disposed close to each other without interfering with each other even if the sensor bracket 13a for installing the flow sensor 13 has a large diameter, or if the flow-regulating valve system 14 has a base with a large diameter. As a consequence, the main body of the flow controller can be decreased in length parallel to the first path 11a of the block body 10, which makes the main body compact.

Furthermore, the flow controller is designed so that the axis with respect to the second path 11b and the third path 11c is positioned on the front surface 10b side of the block body 10. Therefore, the first path 11a and the third path 11c do not interfere with each other. This makes it possible to dispose the third path 11c near a fluid entry port 16 side. Accordingly, the length of the first path 11a of the block body 10 in a fluid-running direction is further reduced. As a result, the above-mentioned compact main body of a proper size for being accommodated in the small housing 1 of 48 millimeters by 48 millimeters is actualized.

In the flow controller, the main circuit board 4 is fixed to the side portion of the path block body 10, and moreover the main circuit board 4 is fitted with the multiway connector (terminal) for electric connection 5. The flow controller is attached with the front plate 8 provided with the indicator and the operation switches with the sub-circuit board 6 interposed therebetween. The flow controller according to the present invention then makes it possible to downsize the main body of the flow controller. Furthermore, the flow controller according to the present invention has the advantage of being set up with ease simply by inserting the main body into the housing 1 from the front surface side and screwing the main body from the back surface side of the housing 1, and the like.

In the flow controller thus constructed, the fluid entry port 2 and the fluid exit port 3 are characteristically formed in the back surface of the housing 1. For this reason, even when a plurality of fluid controllers are aligned on the panel, it is not necessary to secure space for piping in between the flow controllers. Therefore, the flow controllers according to the present invention can be disposed close to each other. Additionally, in the flow controller, the fluid entry port 2 and the fluid exit port 3 are formed in the back surface of the housing 1. The multiway connector (terminal) for electric connection 5 is also disposed in the back surface of the housing 1. Consequently, the flow controller of the present invention has the advantage of making it possible to easily carry out the connecting work of pipes, signal wires, etc. with respect to each of the flow controllers on the back surface side of the housing 1, and the like.

Figure 5A:
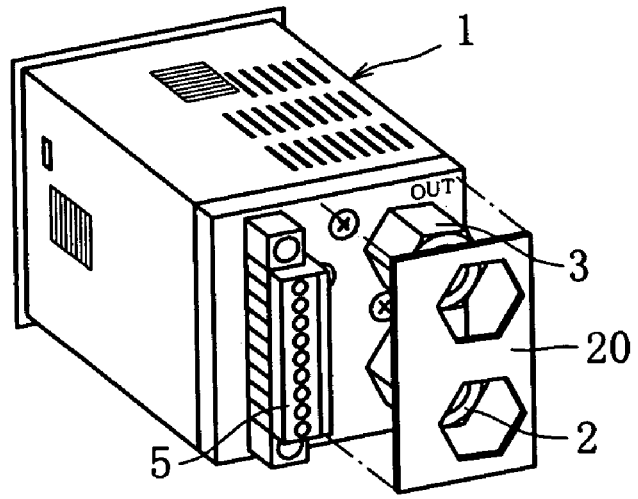
FIG. 5A is a view showing a modification example in the back surface side of the flow controller illustrated in FIG. 1.
Figure 5B:
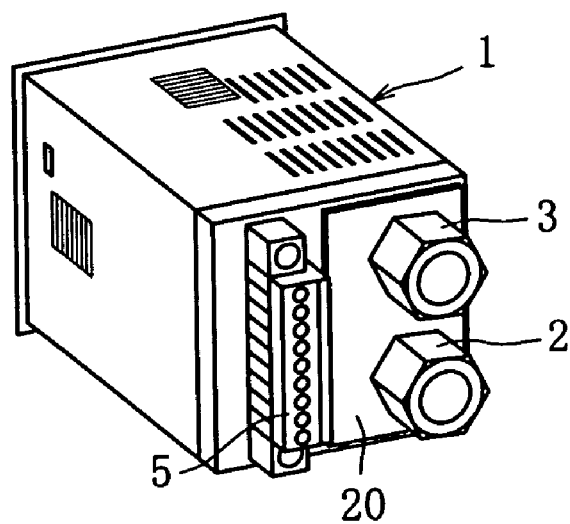
FIG. 5B is anther view showing a modification example of FIG. 3.

For example, after pipes are connected to the fluid entry port 2 and the fluid exit port 3, suspension, such as soapy water, is occasionally applied or sprayed to the connecting portion in order to check (inspect) the airtightness of the connecting portion. In the flow controller according to the present invention, however, a water-absorbing sheet 20 is attached onto the back surface of the housing 1 as illustrated in FIGS. 5A and 5B. Therefore, even if the suspension is applied or sprayed too much, extra suspension is absorbed by the water-absorbing sheet 20 during inspection. To be short, the suspension never accidentally leaks in the inside of the housing 1. As a consequence, the flow controller of the present invention is capable of effectively protecting the main circuit board 4, and the like, installed in the inside of the housing 1 from the suspension.

Figure 6:
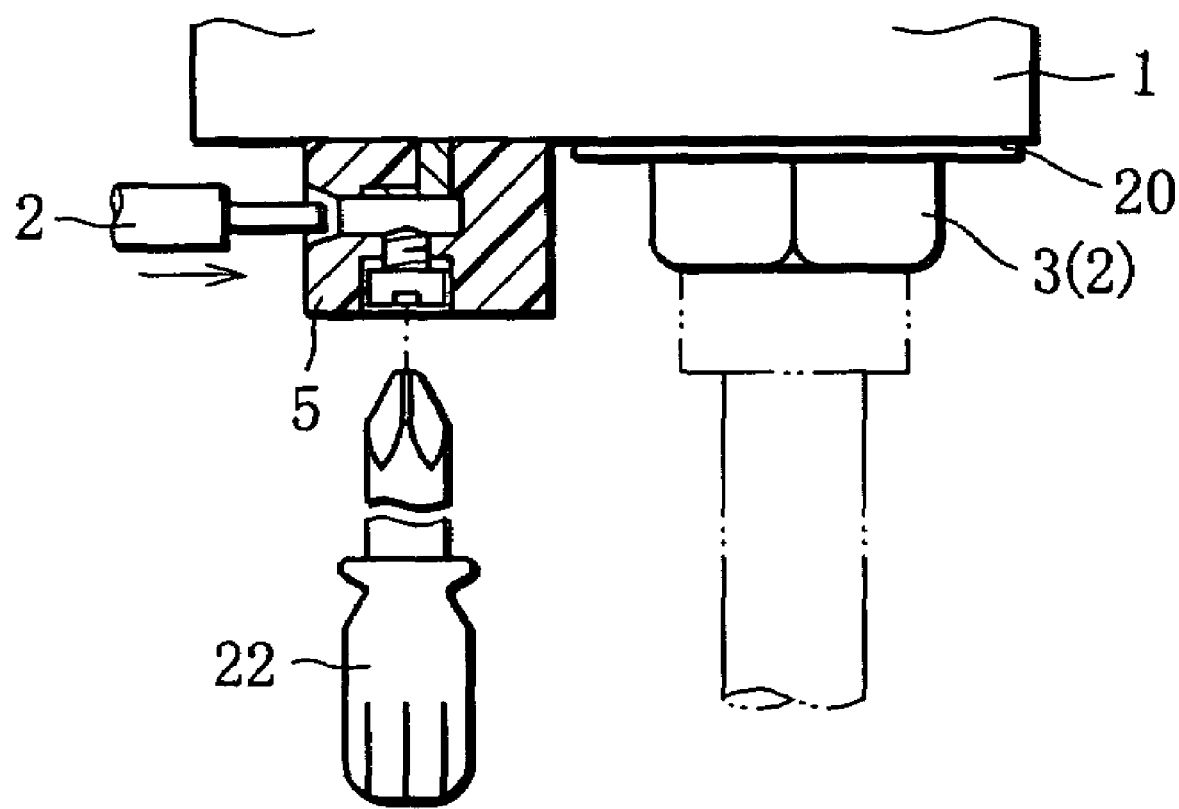
FIG. 6 is a view showing a configuration of a multiway connector (terminal) disposed in a state exposed to the back surface of a housing.

A suitable connector for the multiway connector (terminal) for electric connection 5 is one with a construction in which after a signal wire is inserted from the side of the connector, the signal wire is fastened with a screw disposed on the front surface side as illustrated in FIG. 6. For example, the operator who installs the flow controller can achieve the screwing work by interfitting a signal wire 21 in the multiway connector (terminal) 5 from the opposite side to the fluid entry port 2 and the fluid exit port 3, and using a screw driver 22 from the back surface side of the housing 1. This enables the operator to carry out the connecting work in a natural working position without difficulty.

The present invention is not limited to the above-described embodiment. For example, the size of the housing 1 is sufficient if it is determined on the basis of various kinds of specifications. Objects (fluids) to be controlled by the flow controller may be not only gases including air, nitrogen, argon, carbonic acid gas, and the like, but also liquids, such as water and alcohol. As stated, the flow detector without a flow-regulating valve system is applicable in the same manner. In addition, various modifications can be made without deviating from the gist of the present invention.

As explained above, in the flow detector and the flow controller according to the present invention, the path in the main body is formed in the shape of the letter U, and the fluid entry port and the fluid exit port are both disposed to face toward the back surface of the box-shaped housing. Additionally, the flow detector and the flow controller according to the present invention is constructed so that the contact terminal, such as an electrical signal wire, is disposed in the back surface of the housing alongside of the fluid entry port and the fluid exit port. Therefore, according to the present invention, even in case that a plurality of flow controllers are aligned in the given panel, it is possible to arrange the flow controllers close to each other. Furthermore, the present invention has the great practical advantage of facilitating the connecting work of pipes and the like with respect to each of the flow controllers, and the like.

The invention claimed is:

1. A flow detector comprising:
  a main body including: (i) a block body, which has an inlet and an outlet and which forms a given path, and (ii) a flow sensor which is attached to the block body to detect a flow rate of a fluid running through said path;
  a circuit board having mounted thereon an electric circuit which measures the flow rate of the fluid running through said path by using said flow sensor; and
  a flow regulating valve which regulates the flow rate of the fluid running through said path;
  wherein said main body and said circuit board are accommodated in a rectangular parallelepiped or cubic housing, which is fixable to a given panel;
  wherein said flow-regulating valve is mounted on an upper surface of the block body and the flow sensor is mounted on a surface of the block body which is different from the upper surface of the block body;
  wherein an indicator and an operation switch are provided in a front surface portion of said housing that is exposed at a front surface of said given panel when said housing is fixed to said given panel;
  wherein said inlet and said outlet of said path are provided in a back surface portion of said housing; and
  wherein a terminal for external connection of said circuit board is provided in the back surface portion of said housing.

2. The flow detector according to claim 1, wherein:
  said given path formed by said main body-is U-shaped and the inlet and the outlet of said path face in a same direction; and
  said circuit board is installed substantially parallel to both a side face of said main body and said U-shaped path, and the circuit board is provided with a multiway connector for external connection at an end portion thereof positioned alongside said inlet and said outlet of said path.

3. The flow detector according to claim 2, further comprising a water-absorbing sheet around the inlet and the outlet of said path provided in the back surface portion of said housing.

4. The flow detector according to claim 1, further comprising a water-absorbing sheet around the inlet and the outlet of said path provided in the back surface portion of said housing.

* * * * *